United States Patent [19]

Draper et al.

[11] Patent Number: 4,601,113

[45] Date of Patent: Jul. 22, 1986

[54] METHOD AND APPARATUS FOR FLUIDIZED STEAM DRYING OF LOW-RANK COALS

[75] Inventors: Robert Draper, Churchill Boro; Robert W. Wolfe, Wilkinsburg, both of Pa.

[73] Assignee: Westinghouse Electric Corp., Pittsburgh, Pa.

[21] Appl. No.: 727,950

[22] Filed: Apr. 26, 1985

[51] Int. Cl.⁴ ............................................. F26B 3/04
[52] U.S. Cl. .......................................... 34/10; 34/32; 34/77; 34/57 A; 34/172; 34/177
[58] Field of Search ............... 34/169, 57 A, 172, 177, 34/10, 26, 35, 86, 68, 27, 32, 77, 75, 79

[56] References Cited

U.S. PATENT DOCUMENTS

| | | | |
|---|---|---|---|
| 1,907,569 | 5/1933 | Parr et al. | 34/27 |
| 2,666,269 | 1/1954 | Parry . | |
| 4,052,168 | 10/1977 | Koppelmann . | |
| 4,339,306 | 7/1982 | Janusch . | |
| 4,379,692 | 4/1983 | Weber et al. . | |
| 4,400,176 | 8/1983 | Kuhta . | |
| 4,523,388 | 6/1985 | Cuel | 34/35 |

OTHER PUBLICATIONS

"A Study on Upgrading of Low Grade Coals by Heat Treatment" K. Toada et al.; Technical Review, Oct. 1982, pp. 259–266.
Steam Drying of Lignite; Stanmore et al., NTIS U.S. Dept. of Commerce, Springfield, VA 22161 (1982).
"Enriching Western Coals by Thermal Drying and Oil Treatment", Wegert et al., Coal Age, May, 1976, pp. 96–100.
Technical and Economic Study of Drying Lignite & Subbituminous Coal by the Fleissner Process; Harrington et al., U.S. Govt. Printing Off., 1942.

Primary Examiner—Larry I. Schwartz
Attorney, Agent, or Firm—Daniel C. Abeles

[57] ABSTRACT

A method and apparatus for drying of low-rank coals, such as lignite, where the coal is passed through a sealed vessel in a plurality of heated fluidized beds with fluidization effected by superheated steam flowing countercurrent to the flow of coal. A composite steam is exhausted from the sealed vessel, partially condensed, to remove an amount of water about equal to that removed from the coal, and the steam reheated and recycled to the sealed vessel. The heating of the fluidized beds is by means of heat exchange tubes passing through the beds, with a fluid, such as methanol, heated for flow through the tubes, collected and in a cooled state used in the partial condenser, and then compressed to reheat the same for reuse in the heat exchange tubes.

20 Claims, 2 Drawing Figures

METHOD AND APPARATUS FOR FLUIDIZED STEAM DRYING OF LOW-RANK COALS

CROSS-REFERENCE TO RELATED APPLICATIONS

An apparatus and method for drying of low-rank coals using a fluidized bed steam drying system and wet scrubbing of composite steam from the dryer, are described in a related application of the present inventors, Ser. No. 727,949, entitled "Method and Apparatus for Fluidized Steam Drying of Low-Rank Coals With Wet Scrubbing", filed on even date herewith assigned to the assignee of the present invention.

An apparatus and method for steam drying of low-rank coals using a rotating cylindrical drying vessel, are described in a related application of the present inventors, Ser. No. 727,948, entitled "Method and Apparatus for Steam Drying of Low-Rank Coals Using a Rotary Cylindrical Vessel", filed on even date herewith also assigned to the assignee of the present invention.

BACKGROUND OF THE INVENTION

Reserves of lignite and subbituminous coals in the United States are estimated to be in excess of 1 trillion tons. Demonstrated reserves are presently placed at 250 billion tons. This vast energy reserve is for the most part located in sparsely populated areas of the western United States and in the western gulf states. A large fraction of the reserves are near to the surface and can be strip mined at low cost.

In 1960, the production of lignite and subbituminous coals was insignificant on the national scale. Presently, these low-rank coals account for approximately 25% of the 900 million tons per year United States production rate. Lignite and subbituminous coal production has accounted for virtually all of the growth in coal production which has taken place in the United States in the last decade.

Low-rank coals have relatively low sulphur content. Low sulphur content generally results in easier compliance with regulations pertaining to emissions of combustion products to the atmosphere. As mined, the sulphur content of lignite ranges from 0.3% by weight to 1% and is most commonly about 0.7%. This compares favorably with bituminous coals which range in sulphur content from 1.2% by weight to 3.5%.

The one significant impediment to the use of lignite and subbituminous coal is their high water content. For lignite mined in the United States the water content ranges from 25% by weight to 45% by weight. High water content supresses the caloric value of the coal, creates handling problems, and increases transportation cost. For these reasons, there is great interest in developing economical methods of drying low-rank coals.

Lignite and subbituminous coals hold water in three ways. First, these low-rank coals hold surface water. The amount of surface water which might be present following a wet cleaning process increases with decreasing particle size. Coals crushed to about ¼ in. particle size hold between 10 and 15% by weight surface water. When the coal is crushed to 28 mesh size, surface water can account for as much as 45% of the bed weight. Removal of surface water is accomplished quite readily and the process is commonly called dewatering.

Low-rank coals (especially lignite) hold water in interstitial cavities between the carbonaceous fibers. Interstitially held water can account for as much as 45% of the weight of a bed of lignite from which surface water has already been removed. While lignite and subbituminous coals hold comparable amounts of post-wash surface water to coals of similar particle size but higher caloric rank, the presence of a large amount of interstitial water is unique to the lower-rank coals. The process used to remove interstitially held water is termed drying. Because interstitial water is held in the small pores between the coal fibers, it is not readily removed by mechanical means. Present thermal drying methods are overly consumptive of energy; consequently low-rank coals are usually transported and burned without the beneficial effect of drying.

Another way in which water is held in low-ranked coals is in very small closed pores within the carbonaceous fibers. Because the pores are unconnected, removal of this water is extremely difficult and thermal methods provide the only means. For this reason, this water is referred to as bound water. Bound water constitutes only a few percent of the mass of coals of all calorific ranks and as such, does not represent an attractive target for removal, moreover, no economical means exist for its removal.

As mentioned above, the removal of surface water is termed dewatering. For the most part, dewatering is accomplished by mechanical means. Such means include shaker screens which continually disrupt the coal/water matrix and cause the water to drain from the bed under gravity. Centrifuges are also used to dewater low-rank coals. Another means of removing surface water is vacuum filtration. In vacuum filtration, air is sucked through the bed of coal and draws the water with it. Vacuum filtration can be used in conjunction with vibratory and centrifugal methods. Dewatering can be assisted by the addition of surfactants which lower the surface tension of the water and the application of heat, which, by virtue of an increase in temperature, reduces both surface tension and viscosity. The application of an ultrasonic sound field has been shown to assist the dewatering of fine coal particles.

Thermal dewatering methods involve blowing hot air or the products of combustion through the coal bed. Some heat recovery is possible. However, psychrometric restraints make the recovery of the latent heat of vaporization impractical when the steam is mixed with a large quantity of noncondensible gases. For this reason, present thermal dewatering methodologies are relatively uneconomical and are not widely practiced.

Water held interstitially within the particles of low-rank coals makes no contribution to the calorific value of the coal. Rather, from a caloric viewpoint, it is parasitic in that it absorbs heat to achieve evaporation. Moist coal can freeze in stockpiles during cold weather and transportation costs are inflated because unwanted water is shipped with the coal. For these reasons, and because low-rank coals represent one of the nations most important fossil energy resources, there is growing interest in developing means of removing interstitially held water. This process, as mentioned above, is termed drying, as opposed to dewatering which is correctly applied to the removal of surface water. Presently, very little lignite and subbituminous coal is dried in the United States.

Not surprisingly, the techniques which have been applied to the removal of small amounts of water (a few percent by weight) from high-rank coals have been examined for their applicability to drying lignite and subbituminous coals. These methods are based upon the concept of bringing the coal particles into contact with a hot gas stream such as air or the products of combustion. Tumbling the coal particles in a rotating drum through which the hot gas stream is passed and fluidizing a bed of coal particles with the hot gas stream are two methods which have been used to dry high-rank coals. Two factors combine to render these methods unsatisfactory for the drying of low-rank coals. First, the weight of water which must be evaporated per pound of dried product is much greater for low-rank coals than for high-rank coals. Relative to high-rank coals, the overall economics of low-rank coal utilization is much more sensitive to the economics of the drying process. Moreover, the traditional form of drier, described above, does not operate efficiently from a thermal viewpoint. This is because the low partial pressure of the steam in the steam/hot gas exhaust makes it difficult to recuperate the latent heat of vaporization. Consequently, the energy consumed in drying a low-rank coal exceeds 10% of the caloric value of the dried product.

A second reason why existing thermal driers are not suitable for drying lignite and subbituminous coal is that these coals are more susceptible to spontaneous ignition as they approach a fully dried condition than are higher-rank coals. Reactivity in air increases with decreasing rank because low-rank coals contain a higher fraction of volatile matter. Fine particles of dry lignite present a serious explosion hazard in a high temperature environment containing free oxygen.

Another new drier type which is under investigation is the so-called hot water drier. In this drier, lignite is mixed with water to form a slurry which is then heated to about 650° F. at a pressure sufficient to maintain liquid conditions ($P \cong 2200$ psi). At high temperature, carboxylic groups within the lignite decompose to form carbon dioxide. The $CO_2$ gas expels much of the water from the interstitial cavities. Hydrophilic carboxyl groups on the surface of the coal granule are replaced by hydrophobic hydrocarbon groups. This effect along with capillary factors inhibits repenetration of the interstitial cavities by the water as the system is cooled down and depressurized. Test data indicates that this system is capable of reducing the water content of lignite to about 10% by weight. The high operating values of temperature and pressure present significant difficulties in the design of commercial sized equipment.

Although mechanical methods dominate dewatering technology, they yield to thermal methods when it is necessary to do drying which, by our definition, implies removing interstitially held water. Some work on mechanical drying methods has been performed, however. In this regard it is estimated that a centrifuge operating with a centrifugal acceleration of $5 \times 10^4$ ft/sec$^2$ (twice the highest value used in dewatering equipment) will reduce the water content of a 1 ft. deep bed of lignite from 45% to 10% in 1 minute. Unfortunately, this is associated with a hoop stress close to 17000 psi. This stress is close to the allowable operating level for low alloy steels.

There is interest in the application of ultrasonic compression waves to assist other mechanical drying means such as centrifuging, vacuum filtration, and pressure displacement. However, this technology is in an embryonic stage and any forecast as to its ultimate role in drying low-rank coal is purely speculative.

It is an object of the present invention to provide an apparatus and method for drying of low-rank coals by removal of interstitial water therefrom in an efficient and safe manner.

SUMMARY OF THE INVENTION

An apparatus and method for drying low-rank coals containing interstitial water by the use of superheated steam to fluidize the coal in a plurality of beds in a sealed vessel.

A sealed vessel, preferably vertically disposed, has spaced perforated plates therein upon which beds of fluidized, low-rank coal are formed by superheated steam injected into the vessel and flowing countercurrently therethrough relative to the low-rank coal. Heat exchange tubes are provided in the area of each of the fluidized beds and the low-rank coal is heated to evaporate water, with the evaporated water forming a composite steam with the injected steam, which composite steam is discharged from one end of a sealed vessel while low-rank coal having water removed therefrom is discharged from the other end of the sealed vessel. Means are provided to partially condense the composite steam flow to remove a supply of condensed water substantially equal to the water removed from the low-rank coal in the sealed vessel, and the flow of steam is then reheated and returned for injection into the sealed vessel for reuse. Means are provided for passing a heated fluid through the heat transfer tubes to heat the low-rank coal, passing cooled fluid from the tubes to the partial condensing means for partially condensing the composite steam, and compressing the cooled fluid to heat the same and return it to the heat exchange tubes. In another embodiment, a secondary steam supply is provided which is used to heat the cooled fluid, cool the partial condenser, and heat the steam flow after passage through the partial condenser for return to the sealed vessel.

The present method provides for the drying of low-rank coals by removing interstitial water therefrom with low-rank coal fed to a sealed vessel, and superheated steam injected into the sealed vessel for countercurrent flow therethrough. The superheated steam fluidizes the low-rank coal in a series of fluidized beds where the coal is heated by heat exchange tubes, in the fluidized beds in order to vaporize water therefrom to form a composite steam flow. The composite steam flow is removed from the sealed vessel and low-rank coal, with water removed therefrom, also removed from the sealed vessel. The composite steam is partially condensed to remove condensed steam therefrom in an amount substantially equal to the water removed from the low-rank coal in the sealed vessel, and the steam then reheated and returned to the sealed vessel for reuse. The low-rank coal is heated in the fluidized beds by heat exchange with a heated fluid, and the heated fluid after cooling and condensing by heat exchange with the low-rank coal, and expanding across a valve, is evaporated to partially condense the composite steam. The evaporated fluid is then compressed and reheated and returned to the heat exchange tubes.

DETAILED DESCRIPTION

The present invention provides an apparatus and continuous method for drying low-rank coals. "Low-rank coals" as used herein is used to describe solid carbonaceous fuels having a water content in excess of about 25 percent by weight of the solid carbonaceous fuel. Such low-rank coals include lignite, peat, and sub-bituminous coals which contain water as surface water, interstitial water, and bound water. For the purpose of brevity, the following description will refer to the use of lignite, although drying of other low-rank coals is includable in the invention. The drying of the low-rank coals is effected to give a residual water content of less than about 5 percent by weight based on the weight of the low-rank coal.

Figure 1:
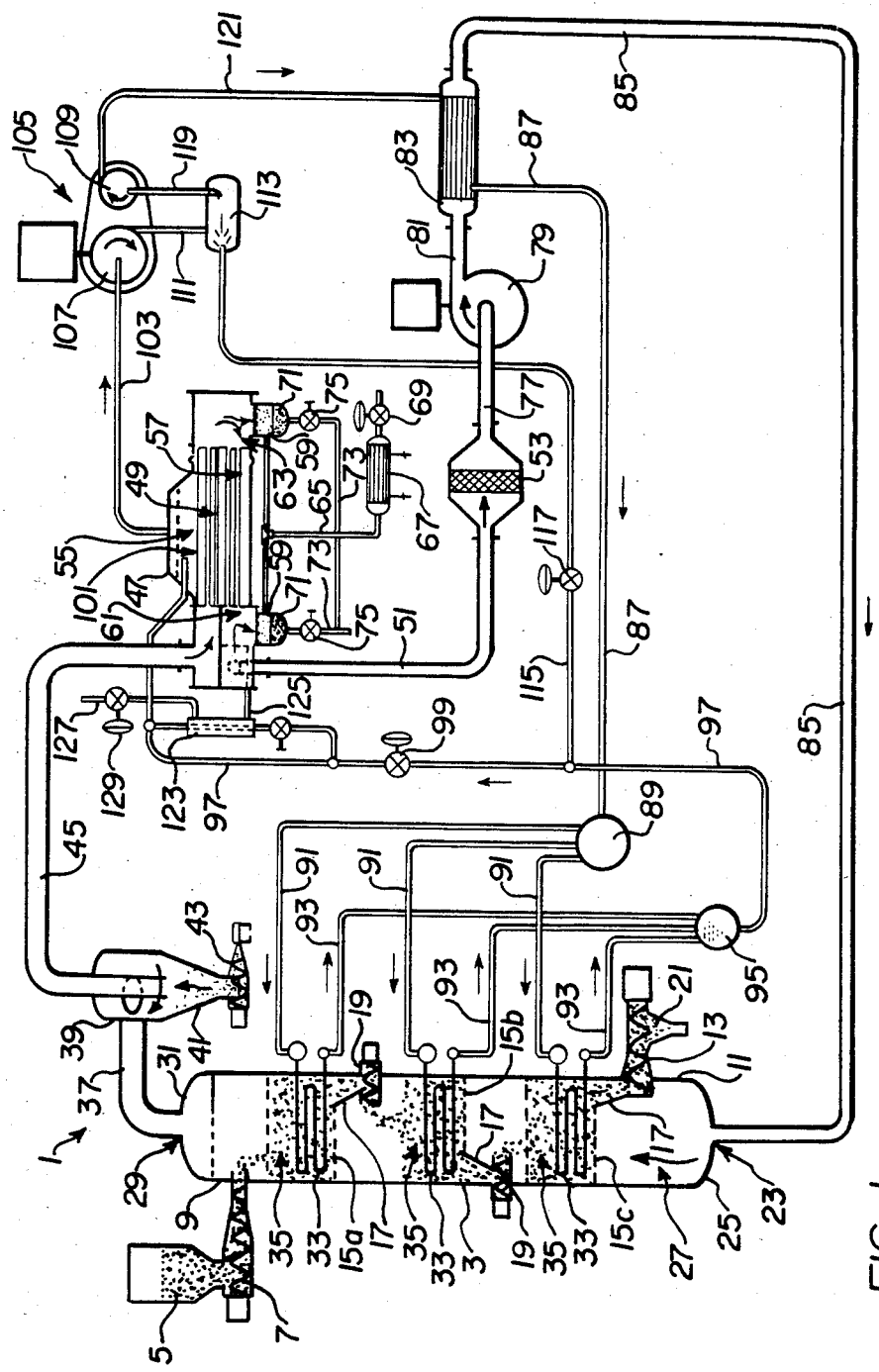
FIG. 1 is a schematic illustration of an apparatus of the present invention for use in the method of the present invention for drying low-rank coal.

Referring now to FIG. 1, an embodiment of the present apparatus 1, which uses methanol as a heating fluid, has a sealed vessel 3, in the form of a vertically disposed cylindrical vessel. Crushed lignite in a particle size preferably between 0.3 to 0.65 cm in diameter, with surface water removed, from a hopper 5 is fed, as by a compacting screw 7, into one end 9 of the vessel 3. As the lignite is passed through the vessel 3, the same is dried as hereinafter described, and is removed from the other end 11, such as by a compacting screw 13. Between the one end 9 and other end 11 of the sealed vessel, there are a plurality of spaced perforated platforms 15, the platforms extending partially across the interior diameter of the sealed vessel 3, as illustrated, with adjacent spaced platforms extending from opposite sides of the inner wall of the vessel 3. As illustrated, the perforated platform 15a closest to the screw 7 extends from the same side of the vessel as contains the compacting screw, the adjacent platform 15b, below platform 15a extends from the opposite side of the vessel, while the sub-adjacent platform 15c extends from the same side of the vessel as platform 15a. This placement of the platforms 15a, 15b and 15c, provides a tortous flow of lignite from the one end 9 to the other end 11 of vessel 3. Internal discharge hoppers 17 are provided adjacent the perforated platforms 15a, 15b and 15c with a screw mechanism 19 therewith to transport lignite from one platform to a subjacent platform, and finally to the removal compacting screw 13, with the dry lignite discharged at 21 for use as a fuel.

A steam injector 23, at the bottom 25 of sealed vessel 3 is provided to inject pressurized steam 27 into the vessel for flow upwardly therethrough and exhaust the same at an exhaust 29 in the top 31 of the vessel 3. Heat exchange tubes 33 are positioned in the vessel 3, adjacently above the perforated plates 15a, 15b and 15c, the heat exchange tubes adapted for flow of a fluid therethrough. Lignite charged to the closed vessel forms beds 35 of lignite material on each of the perforated plates 15a, 15b and 15c which cover the heat exchange tubes 33 as the lignite passes through the vessel 3. Injection of pressurized steam 27 through the injector 23 and passage through the vessel 3 countercurrent to the flow of lignite therein, causes fluidization of the beds 35 of lignite so as to effect good contact between the lignite in beds 35 and the heat exchange tubes 33. The motion of the lignite granules brings the lignite granules and surrounding steam into excellent contact with the heat exchange tubes 33. While FIG. 1 illustrates the use of three perforated plates 15, and thus three fluidized beds 35 of lignite, the actual number of perforated plates, and thus beds, could vary, although a plurality of such beds would be needed. The discharge of lignite from one bed to a subadjacent bed is regulated by the speed of the screw mechanism 21.

An important feature of this multistage fluidized bed drier is that the steam flow which is available for fluidization increases as the steam ascends through the sealed vessel and encounters progressively wetter granular material. For example, the driest granular lignite, which occupies the lowest bed 35, on perforated plate 15c, is fluidized by the recirculated steam flow 27, while the wetter granules in the higher bed 35, on perforated plate 15b, are fluidized by the sum of the recirculated steam flow and the steam evaporated off the lowest bed. Similarly, the wettest lignite in the first stage bed 35, on perforated plate 15a, is fluidized by the sum of the recirculated steam flow and the water which is evaporated off all lower lignite beds. From a fluidization viewpoint this is a very favorable arrangement.

After a period of residence in the last drying bed 35, on perforated plate 15c, the lignite granules are transported out of the drying autoclave by the compacting screw 13. This screw turns at a rate sufficient to maintain the setpoint level in the last bed.

After leaving the sealed vessel 3, through exhaust 29, the composite steam passes through line 37 into a solids separator, such as cyclone separator 39. The term "composite steam" as used herein designates the steam exhausted from the sealed vessel, which is comprised of the steam injected into the sealed vessel for fluidizing purposes and heating of the lignite, as well as the steam resulting from evaporation of water from the lignite. The composite steam is mostly steam with a small amount of air and other gases which are vaporized from the lignite. Some lignite fines are present in the composite steam, although the fact that the wettest lignite bed occupies the uppermost platform 15a of the sealed vessel 3 limits the carryover of fines. Lignite fines collect in the cyclone separator 39 and fall to a discharge hopper 41. From the hopper 41 the lignite fines are discharged from the system by means of a compacting screw 43.

The composite steam flows from cyclone separator for partial condensation and recirculation of a portion thereof, after heating, to the sealed vessel 3. From cyclone separator 39, the composite steam flows through line 45 to a closed vessel partial condenser 47. In partial condenser 47, an amount of steam, by weight, substantially equal to the water removed from the low-rank coal is condensed by contact with cooling tubes 49. The uncondensed steam passes through the heat exchanger 47 and through line 51 to a filter 53. The reason for directing the full flow of composite steam into the partial condenser 47, as opposed to using a full condenser in a side stream configuration, is that the condensing heat transfer coefficient is improved by increasing mass velocity in three ways. First, a higher mass velocity promotes a thinner, higher velocity, condensate film. Second, the presence of noncondensible gases, such as air, is less deleterious to heat and mass transfer when the mass velosity is high. Third, the tendency for a fouling film to form on the tube wall of the partial condenser 47, is lessened with increasing mass velocity. It is worth noting at this point that the reason for preferring tube-side condensing is that in a shell and tube heat exchanger, the tube bores are more easily cleaned than their outer surface.

A two pass tubeside condenser 47, having cooling tubes 49, is illustrated as the preferred partial condenser since it allows the condensate, and any foulant which might be present, to be separated out of the flowstream after a first pass 55. This improves the heat transfer performance in the second pass 57. The condensate (water) is collected in hot wells 59 provided in the lower section of the inlet/outlet head 61 and return head 63, of the partial condenser 47. Condensed water is discharged from the partial condenser 47 through line 65, and is cooled in a heat exchanger 67 before discharge from the system through discharge valve 69.

It is expected that some lignite fines will enter the partial condenser 47 despite efforts to trap the same in the cyclone separator 39. The partial condenser 47 will act as a separator for these particles, which will form a silt 71 at the bottom of the hotwells 59. This silt is removed through lines 73 which contain discharge valves 75.

After leaving the partial condenser 47 through line 51, the uncondensed, recirculated steam passes through a filter 53 and line 77 to a blower 79. The need for the filter 53 depends upon the efficiency of the cyclone separator 39 and the separating effectiveness of the partial condenser 47. A low level of lignite fines is required in order to prevent deposition on the blades of blower 79. The momentum rise which the blower 79 imparts to the recirculated steam is that required to overcome circuit resistances and to accelerate the steam which is evaporated in the sealed vessel 3.

From the blower 79, the recirculated steam flows through line 81 to a heat exchanger 83 in which it becomes superheated. Once superheated, the steam returns to the injector 25 of sealed vessel 3, through line 85.

The means for passing a heated fluid through the heat exchange tubes 33 of the sealed vessel 3, which is in the nature of a heat pump, is illustrated in FIG. 1, where hot methanol is used. The methanol from a line 87 is fed to a distribution header 89 and apportioned between branch lines 91 which communicate with the heat exchange tubes 33. Heat from the methanol passing through heat exchange tubes 33 is transferred to the lignite in the sealed vessel 3 which results in condensation of the methanol. The condensed methanol flows through lines 93 to a collection header 95. Cooled methanol is then directed through line 97, through an expansion valve 99 and is depressurized as it expands, with the resulting two-phase (vapor and liquid) flow entering the shell side 101 of the partial condenser 47 above the liquid level. Heat exchange is effected in the partial condenser, with composite steam cooled and partially condensed, while methanol is evaporated. Methanol vapors are formed which combine with the methanol vapor fraction of the flow from line 97 and is discharged through line 103, while liquid methanol falls into the naturally circulating pool which floods the cooling tubes 49 in the partial condenser 47. Methanol vapor from line 103 is passed to a compressor, preferably a two-stage centrifugal compressor 105, having compression stages 107 and 109. Screw compressors represent a viable alternative under some circumstances and, for very large driers, axial compressors might be used. After the first stage of compression, at 107, the methanol is directed through line 111 to an interstage desuperheater 113, which is preferably a spray evaporator which draws liquid methanol from line 97, through line 115, with the flow of liquid therethrough controlled by means of a flow control valve 117. An alternative means of interstage desuperheating, not shown in the drawings, would require that the methanol vapor exchange heat with the recirculated steam in a heat exchanger similar to heat exchanger 83 and placed upstream of the heat exchanger 83. From the interstage desuperheater, the methanol is charged through line 119 to the second stage 109 of the two stage compressor 105. After further compression in the second stage 109, the methanol is carried through line 121 to the heat exchanger 83 where the methanol is desuperheated by heat transfer to the recirculated steam flow in the fluidizing circuit, and the recirculated steam is superheated for return to the sealed vessel 3. The hot methanol vapors from the heat exchanger 83 are then charged to line 87 for reuse as the heat transfer fluid in the heat transfer tubes 33 of the sealed vessel 3.

The steam outlet head of the partial condenser inlet/outlet head contains the highest concentration of noncondensible gases in the entire steam recirculation circuit. In order to isolate and remove such noncondensibles from the system, a small vertically oriented condenser 123 connects to the steam return head 61 through line 125. The noncondensibles are then exhausted from the system through line 127 containing valve 129.

Since air is to be excluded from the sealed vessel to the maximum extent possible, the sealed vessel is operated at a positive pressure in the region of 1–3 atmospheres, preferably between 1–2 atmospheres. Such a pressure of 1–2 atmospheres corresponds to a water saturation temperature of about 121°–135° C.

The evaporating temperature in the partial condenser must be sufficiently below the sealed vessel composite steam temperature to provide a reasonable temperature difference for heat transfer in the partial condenser. A temperature differential of approximately 8° C. is preferred. Bearing in mind that the composite steam temperature is 121°–135° C. this connotes an evaporating fluid temperature of about 113°–127° C.

In order to provide a good rate of drying, the working fluid condensing temperature should be as highly elevated above the water saturation temperature within the sealed vessel as possible. Considering cost of production requirements, working fluid stability, and hardware limitations, it appears this temperature elevation will be approximately 50° C. when methanol is used as the heatant. This corresponds to a methanol condensing temperature of 171°–185° C. In the system illustrated in FIG. 1, the full 50° C. temperature is available in the beds of lignite. In FIG. 1, the temperature of the superheated steam entering the sealed vessel 3 through line 85 would be about 160°–170° C., the temperature of the methanol in the heat exchange tubes 33, at a saturation pressure, would be about 171°–185° C., and the temperature of the composite steam leaving the sealed vessel 3 through line 37 would be about 121°–135° C.

The invention has been described with the use of methanol as the heated fluid in the heat exchange tubes of the sealed vessel. Other fluids could also be used, for example water, hexane, thiophene, and the like, which would be suitable for heat transfer.

Where the apparatus illustrated in FIG. 1 is used with water as the heated fluid in the heat exchange tubes 33 of the sealed vessel, changes in the temperatures used may result. The temperature of the steam in the heat exchange tubes should be at least 15° C. higher than the temperature of the steam in the sealed vessel, or a temperature of about 175°–185° C. The temperature differences across the partial condenser 47 using water (steam) as the heatant in the heat transfer tubes 33 of sealed vessel 3 would be comparable to or perhaps slightly smaller than the values for the system using methanol because of the superior thermal conductivity of water. The temperature differences between the condensing steam in the shell side 101 of the partial condenser 47, and the steam in the vessel 3, might well be chosen to be substantially less where water is used in the shell side of the partial condenser, however, because of the fact that a steam compressor requires a greater impeller tip speed than a methanol compressor for a given temperature elevation. Because of this, using the same temperature difference could lend to the need for a three stage compressor 105 for a steam system, altering the cost considerations of the system. Another difference between a methanol system and steam system is the result of the maximum allowable temperature of the methanol of approximately 205° C., above which it decomposes. This, in turn, limits the pressures throughout the system since the bulk of the heat is being transferred from condensing to evaporating fluids, the pressures of which are defined by the saturation temperature. Steam, on the other hand, has no practical limit with regard to temperature. Elevation of the pressures for the steam system would thus result in smaller pressure vessels and a smaller compressor. In terms of cost, of course, the higher pressures will result in thicker containment walls.

Figure 2:
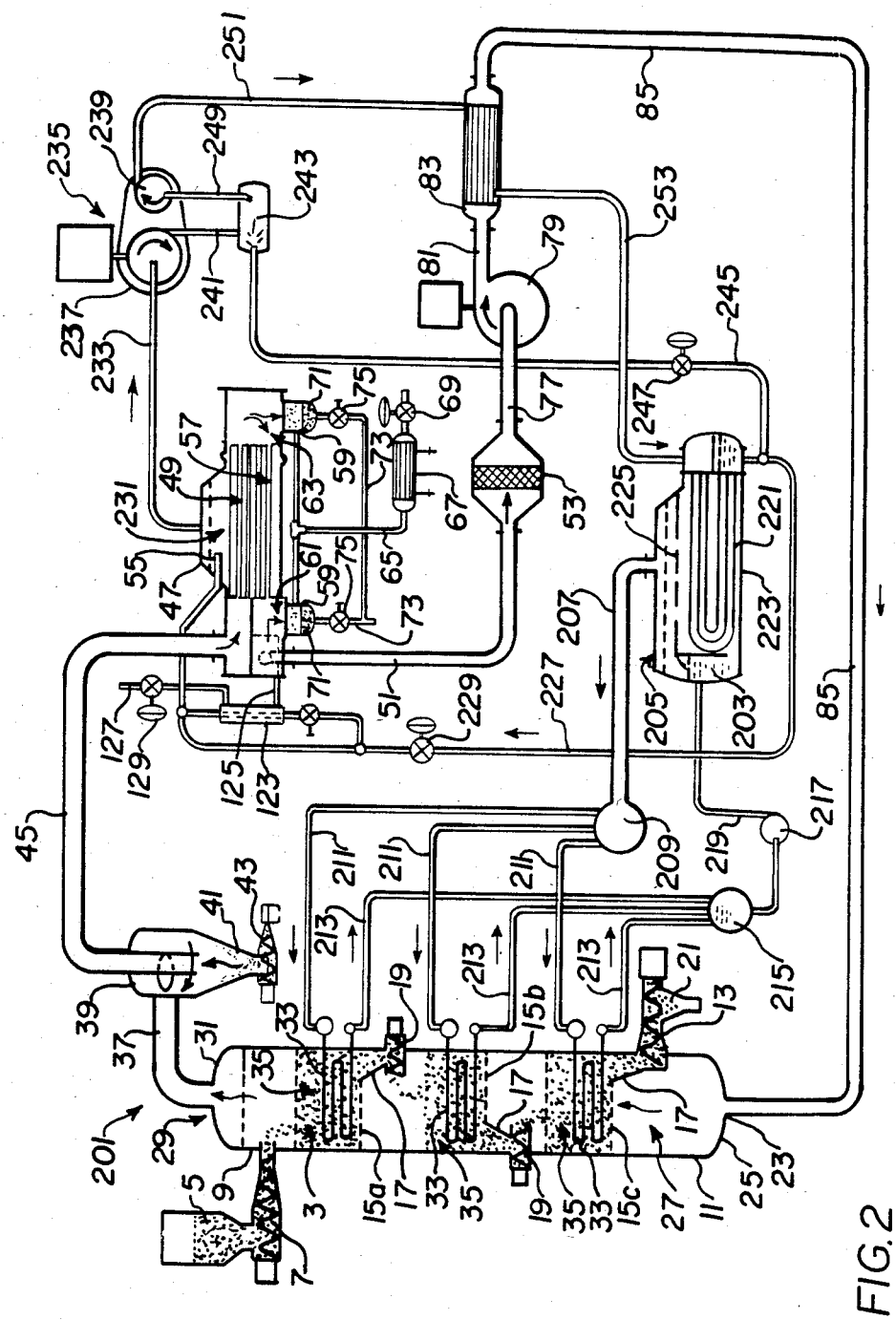
FIG. 2 is a schematic illustration of another embodiment of the apparatus of the present invention for use in another embodiment of the method of the present invention for drying low-rank coal.

An alternate embodiment of the apparatus 201 of the present invention is illustrated in FIG. 2 wherein a secondary fluid circuit is used in conjunction with steam, as the fluid in the heat transfer tubes 33 of the sealed vessel, for drying low-rank coals. In FIG. 2, the sealed vessel 3 and its components, as well as the steam recirculation system for use in heating the lignite in the sealed vessel 3 are the same as that described in FIG. 1 and numbered alike for reference. The distinction between the apparatus 201 and the previously described apparatus lies in the use of a secondary fluid circuit for use in heating the steam passed through the heat transfer tubes 33 and reheating of the fluid after cooling of composite steam in the partial condenser 47.

In FIG. 2, where steam is used as the fluid for heating the lignite, a supply of water 203 is contained in a sealed heat exchange condenser 205, and steam is charged therefrom through line 207 to a distribution header 209. The hot steam is apportioned between branch lines 211 which communicate with the heat exchange tubes 33 in the sealed vessel 3. After transferring heat to the lignite in the sealed vessel 3, which results in condensation of the steam, the water flows through lines 213 to a collection header 215. A pump 217 in line 219 between the collection header 215 and sealed condenser 205 returns the condensate to the supply of water 203 in the sealed condenser 205 for reheating and recycle. A secondary fluid circuit, such as a methanol circuit, is used to heat the supply of water 203, the methanol flowing through heat exchange tubes 221. The sealed condenser 205 effects condensation of methanol on the tube side 223 of a shell and tube condenser, while the water is evaporated on the shell side 225 of the condenser. Condensed methanol from the condenser 205 is fed through line 227, and through an expansion valve 229 for depressurization, with resulting two-phase (vapor and liquid) flow entering the shell side 231 of the partial condenser 47 above the liquid level. Heat exchange is effected with the composite steam in the partial condenser, with the composite steam cooled, and the partially condensed methanol heated. The methanol vapors are discharged through line 233 to a compressor 235 having a plurality of compression stages 237 and 239. After a first stage compression at 237, the methanol is directed through line 241 to an interstage desuperheater 243. The desuperheater 243 draws condensed methanol from line 227, through line 245, containing a flow control valve 247, for spraying into the desuperheater 243. From the desuperheater 243, the methanol is charged through line 249 to the second stage 229 of the compressor 235. The compressed methanol is then carried through line 251 to the heat exchanger 83 where the methanol is desuperheated by heat transfer to the steam being recycled to the sealed vessel 3. The methanol vapors from heat exchanger 83 pass through line 253 to the tube side 225 of the condenser 205 and heat the supply of water 203.

The present invention dramatically reduces energy consumption in drying of low-rank coals by recovering the latent heat of vaporization. Also, there are no combustion product emissions using the present method, and relatively clean water is produced as a biproduct of the method, which is usable in areas where lignite is mined and water scarce. The present method also eliminates the danger of spontaneous ignition within the sealed vessel since an all steam drying environment is present.

What is claimed is:

1. An apparatus for drying low-rank coals containing interstitial water, comprising:
 a sealed vessel containing means for forming a plurality of successive fluidized beds of solids therein, having means for passing low-rank coal solids thereto at one end and means for removing said low-rank coal solids therefrom at the other end after passage therethrough;
 heat exchange tubes extending into said sealed vessel at the location of each of said fluidized beds;
 steam injector means at said other end of the sealed vessel for charging steam into said vessel for passage therethrough countercurrent to the flow of low-rank coal solids to fluidize the same in each of said plurality of successive fluidized beds, and remove interstitial water therefrom to form a composite steam flow;
 means for exhausting said composite steam flow from said one end of the sealed vessel;
 means for partially condensing said composite steam flow, to which said composite steam flow is passed after exhaustion from said vessel, so as to remove a supply of condensed water therefrom substantially equal to the water removed from the low-rank coal in said sealed vessel;
 means for heating said steam flow after removal of said condensed water and returning the heated steam to the sealed vessel through said steam injector means;
 means for passing a secondary heated fluid through said heat exchange tubes, to effect heat exchange between said fluid and said low-rank coal, whereby the low-rank coal is heated and the fluid cooled and condensed;
 means for passing said cooled fluid, after said heat exchange, to said means for partially condensing said composite steam flow to partially condense the same; and means for compressing said cooled fluid, after passage through the means for partially condensing said composite steam, to heat the same and return the heated fluid to said heat exchange tubes.

2. The apparatus as defined in claim 1 wherein said sealed vessel is an elongated vertically extending vessel having a plurality of spaced perforated plates therein, to form said plurality of successive fluidized beds, and means for moving solids from a said plate to an adjacent plate.

3. The apparatus as defined in claim 2 including means for separating solids from said composite steam flow after exhaustion from the sealed vessel and prior to said means for partially condensing the same.

4. The apparatus as defined in claim 3 including means for filtering the steam flow after removal of said condensed water and prior to said means for heating the same.

5. The apparatus as defined in claim 2 wherein said means for partially condensing said composite steam flow is a tube and shell condenser with the composite steam partially condensed on the tube side of said condenser.

6. The apparatus as defined in claim 5 wherein said condenser contains means for collecting condensed steam and means to discharging the collected condensed steam therefrom, and means for allowing said condensed steam to stand to separate solids therefrom prior to said discharge.

7. The apparatus as defined in claim 5 wherein said cooled fluid is passed to the shell side of said tube and shell condenser to partially condense said composite steam.

8. The apparatus as defined in claim 7 including a multi-stage compresser wherein said cooled fluid, after passage through the means for partially condensing said composite steam, is compressed to heat the same.

9. The apparatus as defined in claim 8 wherein said means for heating said steam flow after removal of said condensed water is a heat exchange unit wherein said steam flow is heated by heat exchange with the heated fluid from said multi-stage compressor.

10. The apparatus as defined in claim 5 including a heat exchange condenser unit in which said cooled fluid is collected and means for heating said cooled fluid and returning the heated fluid to said heat exchange tubes.

11. The apparatus as defined in claim 10 wherein means for heating the cooled fluid comprises means for indirectly heating the same by a secondary fluid, to heat the fluid and cool the secondary fluid, and means for passing said cooled secondary fluid to the shell side of said tube and shell condenser to partially condense said composite steam.

12. The apparatus as defined in claim 11 including a multi-stage compressor wherein said cooled secondary fluid, after passage through the means for partially condensing said composite steam, is compressed to heat the same.

13. The apparatus as defined in claim 12 wherein said means for heating said steam flow after removal of said condensed water is a heat exchange unit wherein said steam flow is heated by heat exchange with the heated secondary fluid from said multi-stage compressor.

14. The apparatus as defined in claim 13 including means for returning the secondary fluid from said heat exchange unit, wherein said steam flow is heated, to said heat exchange condenser unit in which said fluid is heated.

15. A method for drying low-rank coal containing interstitial water comprising:
charging low-rank coal to one end of a sealed vessel for passage therethrough;
injecting superheated steam into the other end of the sealed vessel to flow countercurrent to the passage of the low-rank coal;
fluidizing said low-rank coal within the sealed vessel by means of the injected steam in a plurality of fluidized beds;
heating the fluidizing low-rank coal within the fluidized beds in the sealed vessel to remove interstitial water therefrom and form a composite steam flow;
discharging the composite steam flow from said sealed vessel;
discharging low-rank coal with water removed therefrom, from said sealed vessel; and
partially condensing said composite steam after discharge from the sealed vessel to remove water as condensed steam therefrom, in an amount substantially equal to the water removed from said low-rank coal in the sealed vessel, and the steam is then reheated and returned for injecting into said sealed vessel.

16. The method as defined in claim 15 wherein said sealed vessel is vertically disposed, with said plurality of fluidized beds superimposed above each other, with low-rank coal charged to the upper region of the sealed vessel and removed from the lower region thereof.

17. The method as defined in claim 16 wherein the heating of the fluidized low-rank coal is effected by heat transfer from secondary heated fluid passing through heat exchange tubes positioned in the fluidized beds in the sealed vessel.

18. The method as defined in claim 17 wherein said heated fluid is methanol.

19. The method as defined in claim 17 wherein said heated fluid is steam.

20. The method as defined in claim 17 wherein said heated fluid, after said heat transfer to said low-rank coal is used to partially condense said composite steam by heat exchange therewith.

* * * * *